US012748739B2

(12) United States Patent
O'Reilly et al.

(10) Patent No.: US 12,748,739 B2
(45) Date of Patent: Sep. 29, 2026

(54) SYSTEMS AND METHODS FOR DYNAMIC DATABASE MANAGEMENT

(71) Applicants: Kevin O'Reilly, St. Louis, MO (US); Renee O'Reilly, St. Louis, MO (US)

(72) Inventors: Kevin O'Reilly, St. Louis, MO (US); Renee O'Reilly, St. Louis, MO (US)

(*) Notice: Subject to any disclaimer, the term of this patent is extended or adjusted under 35 U.S.C. 154(b) by 0 days.

(21) Appl. No.: 19/184,688

(22) Filed: Apr. 21, 2025

(65) Prior Publication Data

US 2025/0328508 A1 Oct. 23, 2025

Related U.S. Application Data

(60) Provisional application No. 63/636,169, filed on Apr. 19, 2024.

(51) Int. Cl.

*G06F 16/00* (2019.01)
*G06F 16/21* (2019.01)
*G06F 16/2455* (2019.01)

(52) U.S. Cl.

CPC ...... *G06F 16/219* (2019.01); *G06F 16/24558* (2019.01)

(58) Field of Classification Search

CPC ............. G06F 16/219; G06F 16/24558; G06F 16/214; G06F 16/21; G06F 16/2453

See application file for complete search history.

(56) References Cited

U.S. PATENT DOCUMENTS

2002/0184228 A1* 12/2002 Ghukasyan ............. G06F 16/21
2015/0032775 A1* 1/2015 Yang .................. G06F 16/2477 707/770

* cited by examiner

*Primary Examiner* — Yicun Wu
(74) *Attorney, Agent, or Firm* — Armstrong Teasdale LLP

(57) ABSTRACT

A system and method of managing a dynamic database is provided. The system and method includes (i) storing a plurality of recipes in a database, wherein each database recipe includes a plurality of elements, (ii) storing a plurality of linkages between elements of different recipes in the database, (iii) generating a query to compare differences between a first recipe and a second recipe of the plurality of recipes, (iv) determining one or more elements that are different between the first recipe and the second recipe based upon results of the query, and (v) generating a new recipe based on the results of the query and the determined one or more elements, wherein the new recipe includes one or more linkages to a first element associated with the first recipe and one or more linkages to a second element associated with the second recipe.

20 Claims, 8 Drawing Sheets

SYSTEMS AND METHODS FOR DYNAMIC DATABASE MANAGEMENT

CROSS-REFERENCE TO RELATED APPLICATIONS

This application claims priority to U.S. Provisional Patent Application No. 63/636,169, filed Apr. 19, 2024, the entire contents and disclosure of which are hereby incorporated by reference herein in their entirety.

FIELD OF THE INVENTION

The present disclosure relates to dynamic database management and, more particularly, to a system and method for generating new database items based upon existing database items.

BACKGROUND

Databases typically have standard methods for creating new objects. Standard methods involve, for example, inputting all new data for a new item, and generating the item as a particular database schema. However, current database management systems do not support an efficient and collaborative method for generating new database items based on various versions and components of existing database items that preserve traceability of items. Specifically, conventional database systems do not leverage traceability and versioning of database items and database item components to reduce the storage size of database items. Accordingly, it would be desirable to have a system that includes a user-friendly, collaborative, efficient method of generating new database items based upon existing items and item versions.

BRIEF SUMMARY

In one aspect, a dynamic database is provided. The dynamic database includes a processor programmed to execute instructions and at least one memory, wherein the processor is programmed to: (i) store a plurality of recipes in a database, wherein each database recipe includes a plurality of elements, (ii) store a plurality of linkages between elements of different recipes in the database, (iii) generate a query to compare differences between a first recipe and a second recipe of the plurality of recipes, (iv) determine one or more elements that are different between the first recipe and the second recipe based upon results of the query, and (v) generate a new recipe based on the results of the query and the determined one or more elements, wherein the new recipe includes one or more linkages to a first element associated with the first recipe and one or more linkages to a second element associated with the second recipe.

In another aspect, a method for managing a dynamic database is provided. The method is implemented on at least one processor in communication with at least one memory. The method includes (i) storing a plurality of recipes in a database, wherein each database recipe includes a plurality of elements, (ii) storing a plurality of linkages between elements of different recipes in the database, (iii) generating a query to compare differences between a first recipe and a second recipe of the plurality of recipes, (iv) determining one or more elements that are different between the first recipe and the second recipe based upon results of the query, and (v) generating a new recipe based on the results of the query and the determined one or more elements, wherein the new recipe includes one or more linkages to a first element associated with the first recipe and one or more linkages to a second element associated with the second recipe.

In another aspect, a method for managing a dynamic database is provided. The method is implemented on at least one processor in communication with at least one memory. The method includes (i) storing a plurality of recipes in a database, wherein each database recipe includes a plurality of elements, wherein the plurality of elements including at least one of a component, a version, a procedure, an ancestor, or a characteristic for the corresponding database recipe; (ii) storing a plurality of linkages between elements of different recipes in the database; (iii) prompting a user to enter a search term; (iv) querying the database to return a first database recipe based upon the search term; and (v) transmitting the first database recipe to a user computing device, where the transmitted database recipe includes one or more linkages to an element of a second database recipe.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
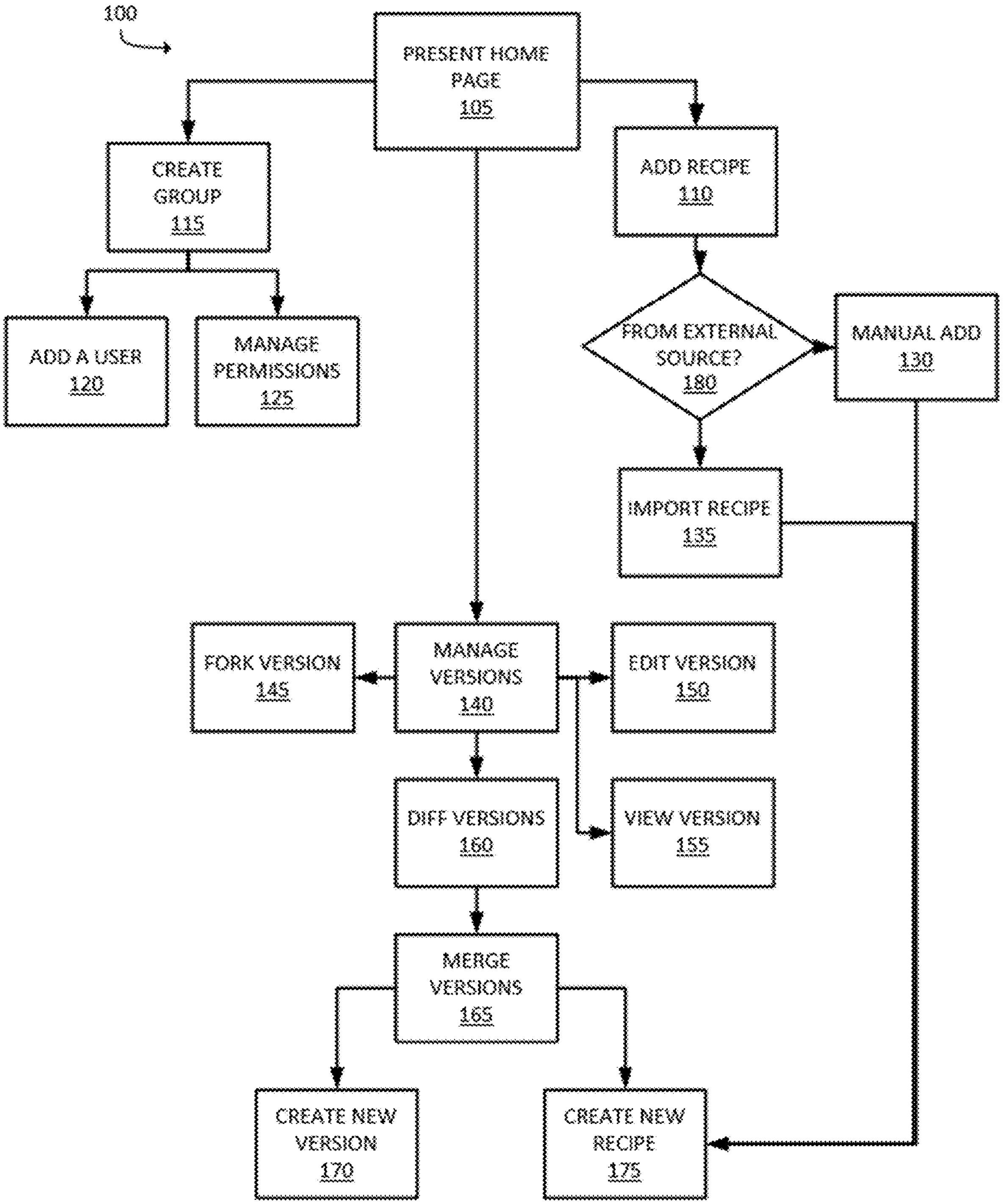
FIG. 1 illustrates a flowchart of managing a dynamic database, in accordance with one embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments may relate to, inter alia, systems and methods for dynamic database management, and more particularly, to a system and method for generating new database items based upon previous versions of database items.

The system described herein is configured to generate new database items based upon components and versions of existing database items. In the exemplary embodiment, the system may prompt a user to select between components of one or more existing database items and generate a new database item based upon the selections. The system may only save altered components of the generated database item, referring to previous components in the existing database items to improve efficiency and reduce storage constraints.

In the exemplary embodiment, a user may be prompted with a home page. The home page may display active database items and item groups to the user. The user may search for one or more items, and a list of items may be displayed based upon the user's permissions to view those items. Each item may have individual permissions, for example, to view, fork, diff, merge, edit, or otherwise interact with or view the item. An active version of each database item may be designated by a user having the appropriate permissions.

In the exemplary embodiment, a database item may include one or more elements, for example, one or more versions, procedures, components, contributors, and ancestors. A version shows a snapshot of the database item at a particular point in time. A procedure may include one or more instructions associated with the item. A component may include individual elements associated with the item. Each component may include one or more characteristics associated with the component. Contributors may include any user who has contributed and/or altered any component of a database item. Ancestors include any prior version of the database item, including the immediate "parent(s)" from which the database item was generated.

A user may add a new database item either manually (e.g., entering data into fields), may import an item from an external source, or may generate a new item based upon an existing database item. Importing the item may include, for example, parsing and generating a database item based upon information from a link, file, or other source. If an item is generating based upon a previous item, the differences between the new item and the previous item may be cached or otherwise saved in association with the new item and/or the previous item, while elements in the new item that are identical to a previous item may be stored as a reference, pointer, and/or link to the previous item to reduce storage size of the new database item.

Database items may be stored in groups. Each group may have an associated list of users that can view and/or edit items within the group. User permissions may be managed at either the group level, individual user level, or item level. An item may be forked into a group. Forking an item copies the contents and creates a new item without altering the original item. A forked item may include linkages to prior versions and/or ancestors of the forked item, provided the user has permissions for those prior versions and/or ancestors.

Database items may be "diffed" to identify differences between two items. For example, a user may select a source item and a target item. A particular version of the source and target may be selected. The diff may compare one or more elements of the two database items, including at least the components, characteristics, procedures, and/or descriptions of the items. The diff may show a difference or an average between the elements of the database items. In some embodiments, the diff may automatically account for differences in format between items and convert differing elements into the same format (e.g., if one database item lists a component in ounces while the other lists a component in milliliters, the database may convert both to ounces for the diff). If a base amount of a component is different, the system may automatically raise a base amount to match a highest common denominator for the component for the purposes of the diff.

Database items may be "merged" to create to new database items. Merging may occur following or during the diffing process. For example, a user may select some elements from the source item, other elements from the target item, and may combine the elements to generate a new database item. Elements may be mixed and matched, averaged, and/or altered with a custom formula before merging.

The system is configured to allow for collaboration between users. Users may share database items, make versions of database items, leave comments on database items, review and/or rate database items, and join groups to view database items.

At least one of the technical problems addressed by this system may include: (i) improving the efficiency of storing versions of items in a database by storing linkages to old elements and only storing new elements in their entirety; (ii) improving traceability of database items through enhanced version tracking; (iii) improving the generation process of new database items through an enhanced diff process.

The methods and systems described herein may be implemented using computer programming or engineering techniques including computer software, firmware, hardware, or any combination or subset thereof, wherein the technical effects may be achieved by performing at least one of the following steps: (i) storing a plurality of recipes in a database, wherein each database recipe includes a plurality of elements, (ii) storing a plurality of linkages between elements of different recipes in the database, (iii) generating a query to compare differences between a first recipe and a second recipe of the plurality of recipes, (iv) determining one or more elements that are different between the first recipe and the second recipe based upon results of the query, and (v) generating a new recipe based on the results of the query and the determined one or more elements, wherein the new recipe includes one or more linkages to a first element associated with the first recipe and one or more linkages to a second element associated with the second recipe.

Exemplary Dynamic Database Management

While the term recipe is used within this document, one having skill in the art would understand that the systems and methods could be used for manufacturing instructions, chemistry, exercises, and/or any other systems where there are multiple steps, components, procedures, and/or ingredients required to create something. It should be understood that this is not intended to limit the scope of the database items to only include recipes or processes.

FIG. 1 depicts a view of an exemplary diagram showing an example process 100 for management of a dynamic database. The dynamic database may include a home page, a list of recipes, and a list of groups.

In the exemplary embodiment, when a user interacts with the dynamic database, the system may present 105 a home page, including a view showing active recipes that the user has permissions to view. The home page may further include a prompt to add 110 a recipe, a prompt to manage or create 115 groups, and a prompt to search for recipes.

In the exemplary embodiment, a recipe includes one or more data elements, including a set of components and procedures, with each recipe having at least one version. A component may be an individual element used in the creation of a recipe (e.g., an ingredient, a material, an exercise), with each component having one or more characteristics (e.g., costs, calories, price, brands, allergens). The version includes all information related to the recipe at a certain point in time. Recipes may further include procedures, which include instructions used to create the recipe. An active version of a recipe may be designated by a user having the appropriate permissions. In some embodiments, a recipe contributor may be associated with a recipe, the recipe contributor being an original publisher of a recipe who controls permissions associated with the recipe (if allowed to do so by any group permissions). In some embodiments, a version contributor may be associated with a recipe, the versions contributor showing the user who created the particular version of the recipe. Each recipe may further include a parent recipe and any ancestors associated with the recipe.

In some embodiments, recipes may be added 110 as composite recipes. A composite recipe is generated from two or more component recipes. For example, a pie recipe may be stored as a composite recipe that includes a pie crust as one component recipe, and a pie filling as a second component recipe. Component recipes may be full recipes that include components, procedures, versions, ancestors, and all other features associated with a recipe. This improves database efficiency by allowing users to store links and/or linkages to component recipes when generating a new recipe, reducing storage overhead for composite recipes.

In the exemplary embodiment, the dynamic database may include various functions to add recipes. For example, a manual addition function may permit a user to manually enter data for the various elements associated with a recipe to manually add 130 a recipe to the dynamic database. An import function may permit a user to import 135 a recipe from an external source. For example, a user may input a link to a website containing recipe information, at which point dynamic database determines 180 that the recipe originates from an external source. Dynamic database may parse information from the link, associate the parsed information with the appropriate recipe element, and save the parsed information as a new recipe. Parsing information to associate with recipe elements may be done using natural language processing, machine learning, parsing information from a website to generate an information file (e.g., parsing a JSON file), and/or through other methods. Before entering and saving the new recipe, the user may be given an opportunity to edit the recipe, add the recipe to a group, or alter the recipes permissions. In some embodiments, dynamic database may store the associated information file from an external source, such that the file may be directly used by future users to generate the associated recipe, reducing computational overhead and improving database speeds by avoiding a website query. In some embodiments, dynamic database may include a web-scraping function to extract and store relevant information from websites as recipes in the database. Relevant information may be determined based upon user preferences, user history, and/or other metrics. In some embodiments, information files may be parsed using a machine learning model trained to identify relevant data for a recipe and associated the data with the appropriate element for the recipe. Upon entry or acquisition of the necessary data to generate a new recipe item, the new recipe is created 175 in the dynamic database.

In the exemplary embodiment, after a recipe is added, the user who added the recipe may control access to the recipe by managing 125 permissions. Recipes may have access controlled directly, such as by granting individual users permissions to view, edit, fork, diff, merge, and save the recipe. Permissions may be managed 125 at a recipe level, group level, and/or user level.

In the exemplary embodiment, a user may further add a recipe to a group, each group having one or more recipes and one or more group users. Permissions for a group may be managed 125 for all group users simultaneously, for example, by giving all users associated with a group permission to view and fork the recipe. Moderators for a group may mange the group by adding 120 or removing users, adding new moderators, adding and removing recipes, granting and/or removing rights of users, and publishing versions of recipes associated with the group. Users within a group may view recipes, make new recipe versions within the group, set versions to an "active" status, make a recipe public, and provide feedback on recipes within the group. Moderators may control user permissions within the group by adding or removing user permissions. By default, a creator of a group may be designated as the first moderator for that group.

In the exemplary embodiment, a user may interact with recipes in the dynamic database in various ways, including viewing 155 recipes, sharing recipes, creating 170 new versions, commenting on recipes, reviewing and/or rating recipes, and joining groups to access groups of users and recipes. Each user may be assigned to their own private user group to store their personal recipes.

In the exemplary embodiment, a user may share a recipe through a link generated by dynamic database or by granting another user permission to view the recipe. The user may elect to share a particular version, or may elect to share a default active version of the recipe. When sharing recipes, permissions may be handled on the recipe level, for example, by allowing a user to restrict viewing to only the active version of a recipe, only the immediate history of the recipe, or permitting access to all history.

In the exemplary embodiment, after a recipe is added, a user having the appropriate permissions may alter the recipe or generate a new related recipe. Users may, for example, create 170 a new version of a recipe by forking 145, diffing 160, sharing, and/or editing 150 a recipe.

In the exemplary embodiment, editing 150 a recipe includes a user making changes to elements of a recipe, including changes to components, procedures, and/or description of a recipe. As a user makes changes with the edit function, dynamic database may actively display differences from a previous version. An edited recipe may be saved as a new version or a new recipe. Editing functions may include at least: undoing or redoing changes, changing the order of procedures, adding elements, removing elements, changing characteristics of a component, selecting components and procedures, and/or making any other change to data elements associated with the recipe. When an edited recipe is saved as a new version, the new version may include linkages, references, links, and/or pointers to shared components with the parent and/or ancestor recipes to reduce the new version's storage size.

In the exemplary embodiment, forking 145 a recipe may include copying a recipe or group of recipes to a group. Changes made to a forked recipe are independent from the original recipe and do not show up as versions associated with the original recipe. In some embodiments, a user may choose to include ancestors associated with the forked recipe in the recipe's version history. Groups may be generated based on one or more properties or characteristics associated with a recipe (e.g., low-sodium group, low-sugar group, etc.).

In the exemplary embodiment, diffing 160 a recipe includes identifying and calculating differences and commonalities between a plurality recipes or versions of a recipe. Diffing 160 may compare at least one of components, characteristics, procedures, and/or descriptions of recipes. The results of a diff may be used by a user to begin a merge 165 to combine two or more different recipes and/or versions. To begin a diff, a user may be prompted to select a source recipe and a target recipe, including a specific version of each recipe (including comparing two versions of the same recipe). When a diff is completed, the user may be presented with a list of differences between the two recipes. Differences may be calculated based upon one or more preferences selected by the user. For example, differences may be shown an average value between two recipes. The diff may adjust units or values to ensure equal comparisons, such as by adjusting a portion sizes to be equal between recipes, by showing differences in the highest common denominator unit of measure, and/or by automatically converting units of measure to match between the recipes.

In the exemplary embodiment, the dynamic database may include a merge function to merge 165 two or more different recipes and/or versions. The merge function permits a user to generate a new recipe and/or recipe version from versions being compared during the diff function process. The user may mix and match from the various data elements, choose an average between data elements, and/or generate a custom formula to generate a new data element. As an example, for a source recipe A for wheat bread and a target recipes B for banana bread and C for chocolate banana bread, a user may choose to use the number of eggs from recipe A, may average the water between recipe A and recipe B, and may choose to use three-fourths of the highest flour value between recipes A, B, and C. The new elements selected by a user during the merge become components of the newly merged recipe, and the common elements are kept as elements for the new recipe from the target and source recipes. Recipes A, B, and C may then be listed as ancestors for the newly merged recipe to permit traceability of the recipe. In some embodiments, a merged recipe item may be stored as a new entry, or may be stored by only storing differences from prior versions to reduce storage space needed for merged recipes. For example, a merged recipe item may be generated with full content for data elements for fully changed items compared to ancestors, but may include linkages, references, pointers, links, and/or other non-direct representations of data to elements that are identical to those found in parents and/or ancestor recipes.

In the exemplary embodiment, a user may elect to give feedback on recipes and versions of recipes. For example, a user may ask questions about a recipe, rank a recipe, comment on a recipe, and give feedback on a recipe, including links to various versions of the recipe (e.g., a user may share their version showing modifications on a recipe with the recipe creator).

In the exemplary embodiment, users may search for recipes within dynamic database. Searching may include searching for specific recipes, components, characteristics, and/or descriptions. Search results may include only those results that a user has permission to view. Results may be filtered or sorted by user rankings, feedback, questions, comments, relevance, and/or other criteria. Upon entering a search, the system and/or a user device may generate a query to send to dynamic database to return and/or transmit items matching the query terms to the user. In some embodiments, returned items may include components that are linkages, references, pointers, and/or links to components of other versions stored in the database, reducing the size of files produced and transmitted by the query.

In some embodiments, dynamic database may be in communication with one or more external sources and/or external vendors. For example, if a specific component or brand-name component is used in a recipe, the associated item in dynamic database may include a link to a vendor to purchase the item within the recipe. In some embodiments, dynamic database may permit a user to perform the purchase transaction for elements of the recipe without visiting an external website by providing a purchase interface to the user. In the event that more than one vendor carries a components, dynamic database may present a list of vendors to permit the user to select between them.

In some embodiments, dynamic database may transmit a notification to a user when an ancestor of a recipe associated with the user undergoes a change. For example, if user A generates a recipe and user B forks a new version, when user A edits the original recipe, user B will receive a notification that the original recipe has changed and be prompted to diff and merge versions of the recipe if desired. In some embodiments, a user may elect to "follow" another user of dynamic database. When the followed user performs an action (e.g., sharing a recipe, changing an active version of a recipe), dynamic database may transmit a notification to the following user, where the notification may contain information relating to the actions taken by the followed user.

In some embodiments, dynamic database may track metrics associated with a recipe and/or a recipe version. Metrics may include, for example, the number of times a recipe has been forked, tracked responses to questionnaire associated with a recipe, a number of versions associated with a recipe, a ranking and/or rating associated with a recipe, and a number of comments associated with a recipe.

Exemplary Database Structure

Figure 2A:
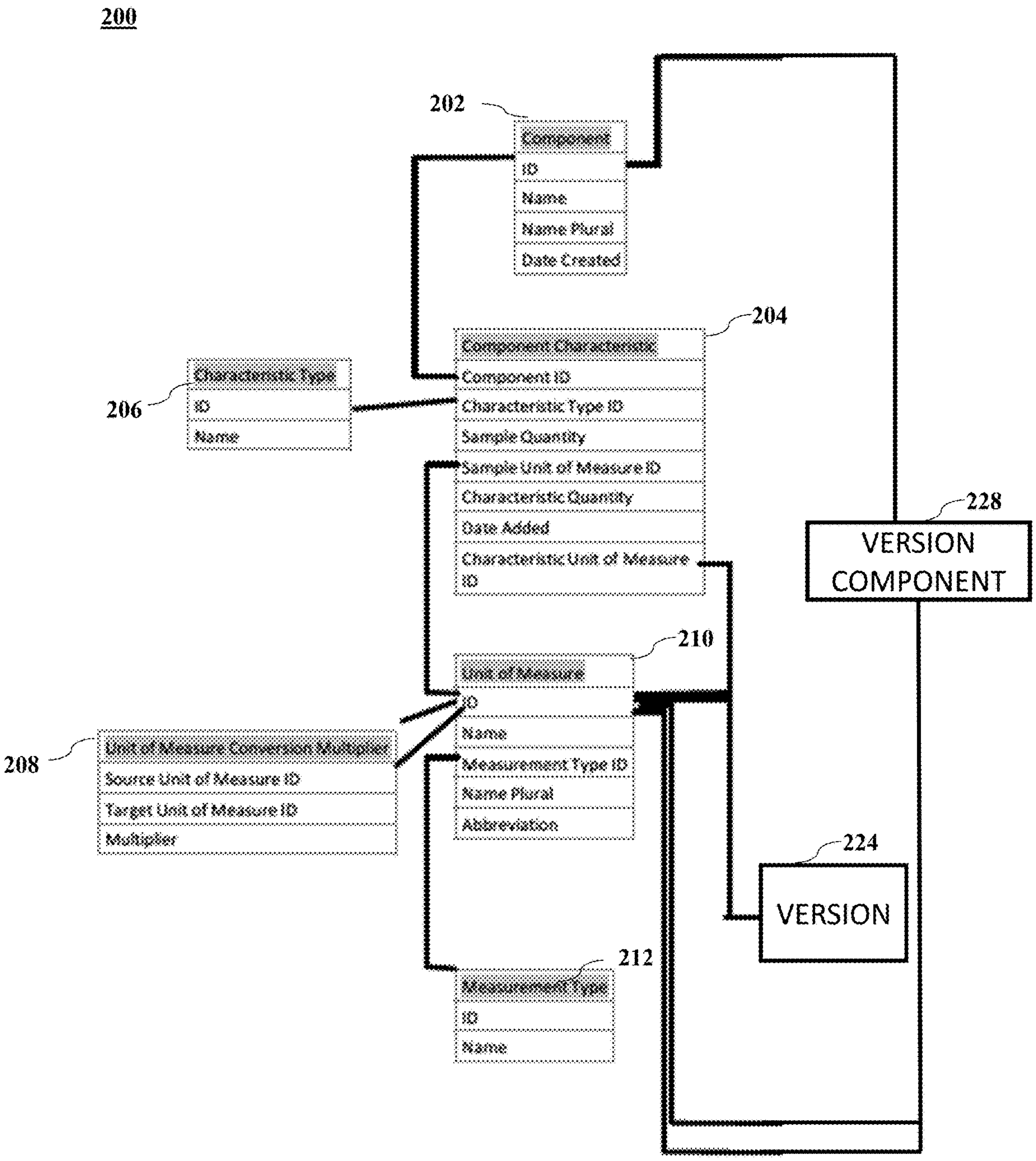
FIG. 2A illustrates a first portion of a flow chart of an exemplary database schema for the database management process shown in FIG. 1.
Figure 2B:
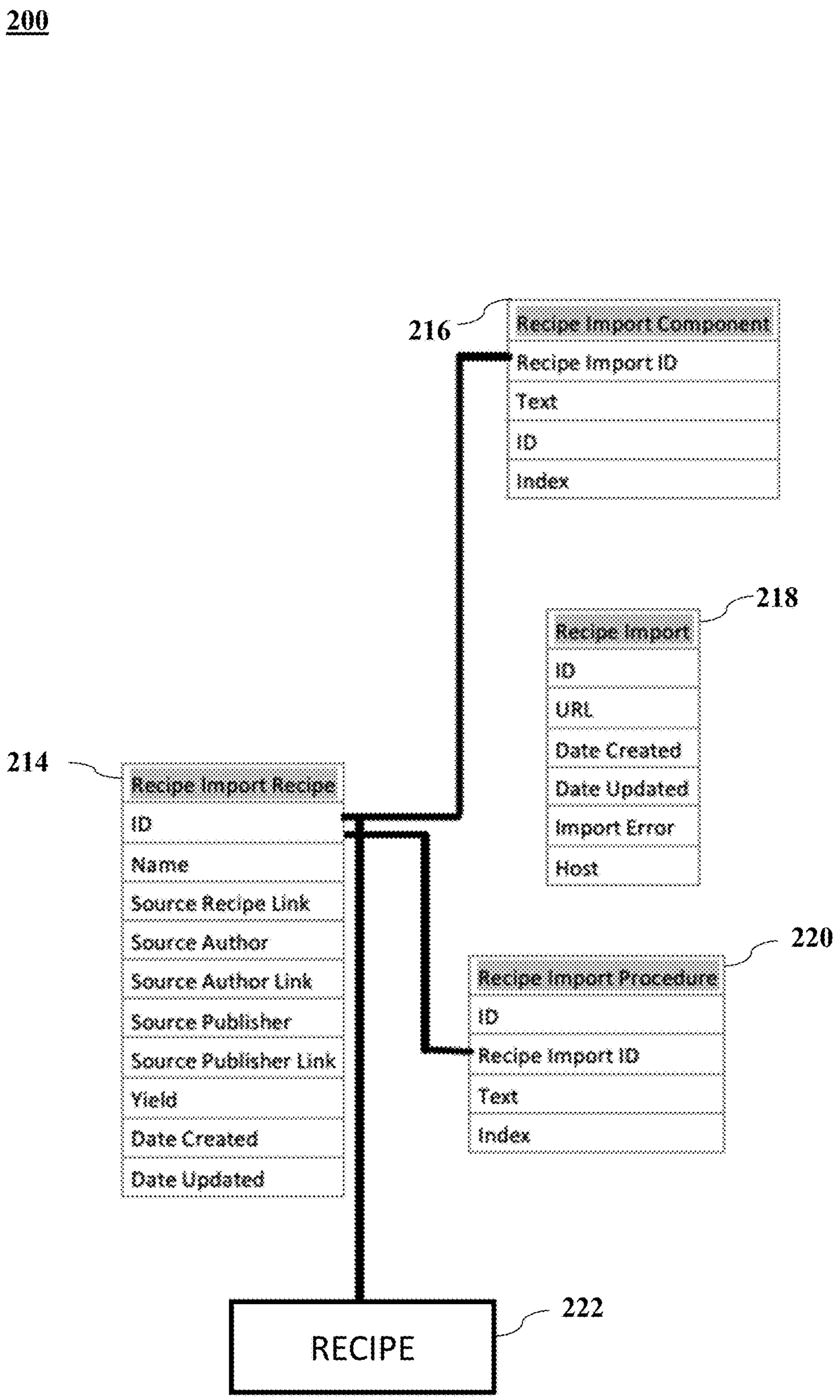
FIG. 2B illustrates a second portion of the flowchart of FIG. 2A.
Figure 2C:
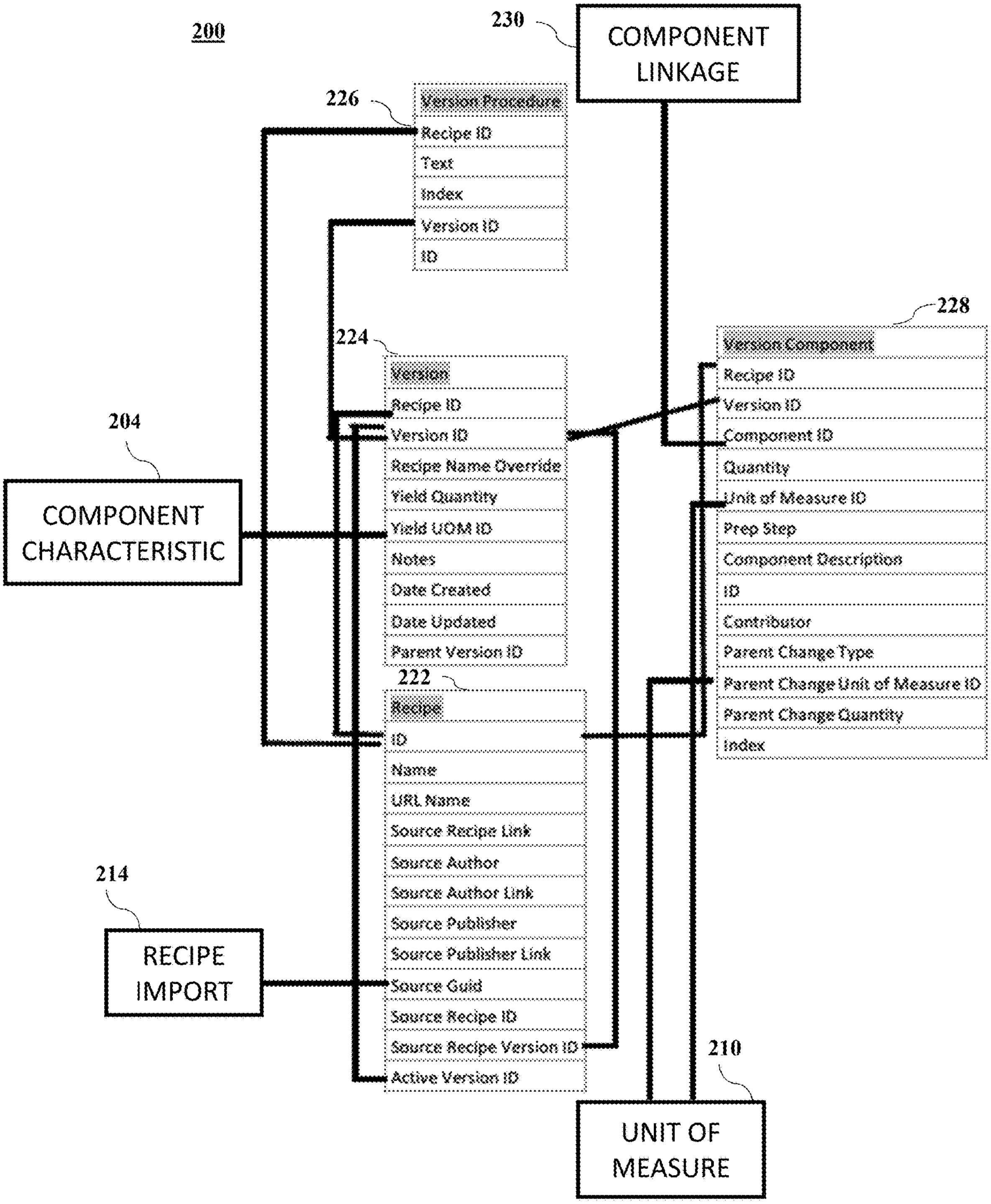
FIG. 2C illustrates a third portion of the flowchart of FIG. 2A.

FIGS. 2A, 2B, and 2C illustrate a diagram of an exemplary database structure for recipes and versions stored in dynamic database 200.

In the exemplary embodiment, as shown in FIG. 2C, each recipe 222 is associated with one or more elements, for example, an identifier (ID), a name, an associated URL name, a source recipe link, a source author link, a source publisher, a source publisher link, a source globally unique identifier (GUID), a source recipe ID, source recipe version ID, and an active version ID with a foreign key.

In the exemplary embodiment, some of the data associated with each recipe may be generated from an imported recipe 214, including the identifier, the name, the source recipe link, the source author, the source author link, the source publisher, the source publisher link, the yield, the date created, and the date updated. The imported recipe may receive information from a recipe import component 216, a recipe import 218, and a recipe import procedure 220. Recipe import component 216 may include a recipe import ID, text, an identifier, and an index. Recipe import 218 may include an identifier, an associated URL, a date created, a date updated, information on import errors, and a host. The recipe import procedure 220 may include an identifier, a recipe import identifier, text, and an index. The information in the imported recipe may be generated by an import recipe process as described with respect to FIG. 1.

Each recipe may be associated with one or more versions 224. Versions 224 may include a recipe identifier, a version identifier, a recipe name override, a yield quantity, a yield unit of measure ID with a foreign key, notes, a date created, a date updated, and a parent version identifier. Information for versions 224 may be generated from a version procedure 226, including at least the recipe identifier, text, index, version identifier, and a version procedure identifier.

In the exemplary embodiment, each version 224 may further be associated with a version component 228. Version component 228 may include at least a recipe identifier, a version identifier, a component identifier, a quantity, a unit of measure identifier, a preparation step, a component description, an identifier, a contributor, a parent change type, a parent change unit of measure identifier, a parent change quantity, and an index.

In the exemplary embodiment, information in each version component 228 may be generated from a component 202 and a unit of measure 210.

Component 202 information may include at least an identifier, a name, a plural version of the name, and a date created. Each component 202 may be associated with one or more component characteristics 204, including a component identifier, a characteristic type identifier, a sample quantity, a sample unit of measure identifier, a characteristic quantity, a date added, and a characteristic unit of measure identifier. Each component characteristic 204 may further be associated with a characteristic type 206, including at least an identifier and a name.

Units of measure 210 may include at least an identifier, a name, a measurement type identifier, a plural version of the name, and an abbreviation. Each measurement may further be associated with a measurement type 212 which includes at least an identifier and a name. Each unit of measure 210 may further be associated with a unit of measure conversion multiplier 208 which includes at least a source unit measure identifier, a target unit measure identifier, and a multiplier.

In some embodiments, elements of the database items described above may be stored as a linkage to another database element. The linkage may include, for example, a link, pointer, reference, and/or other data storage mechanism or method that stores an indirect identifier of the data. In the example shown in FIG. 2C, for example, the component ID of versions component 228 is stored as a component linkage 230, referencing the component ID stored in component 202. In another example, where a recipe 222 is for banana bread and a component 202 of the banana bread includes a recipe for dough, component 202 may be stored as a linkage to the recipe for dough.

In some embodiments, the database elements described above may be associated with more functionality or additional elements. For example, in some embodiments, components 202 may be associated with one or more vendor links to permit a user to purchase a component listed in a recipe from an external vendor source.

Exemplary Computer Process

Figure 3:
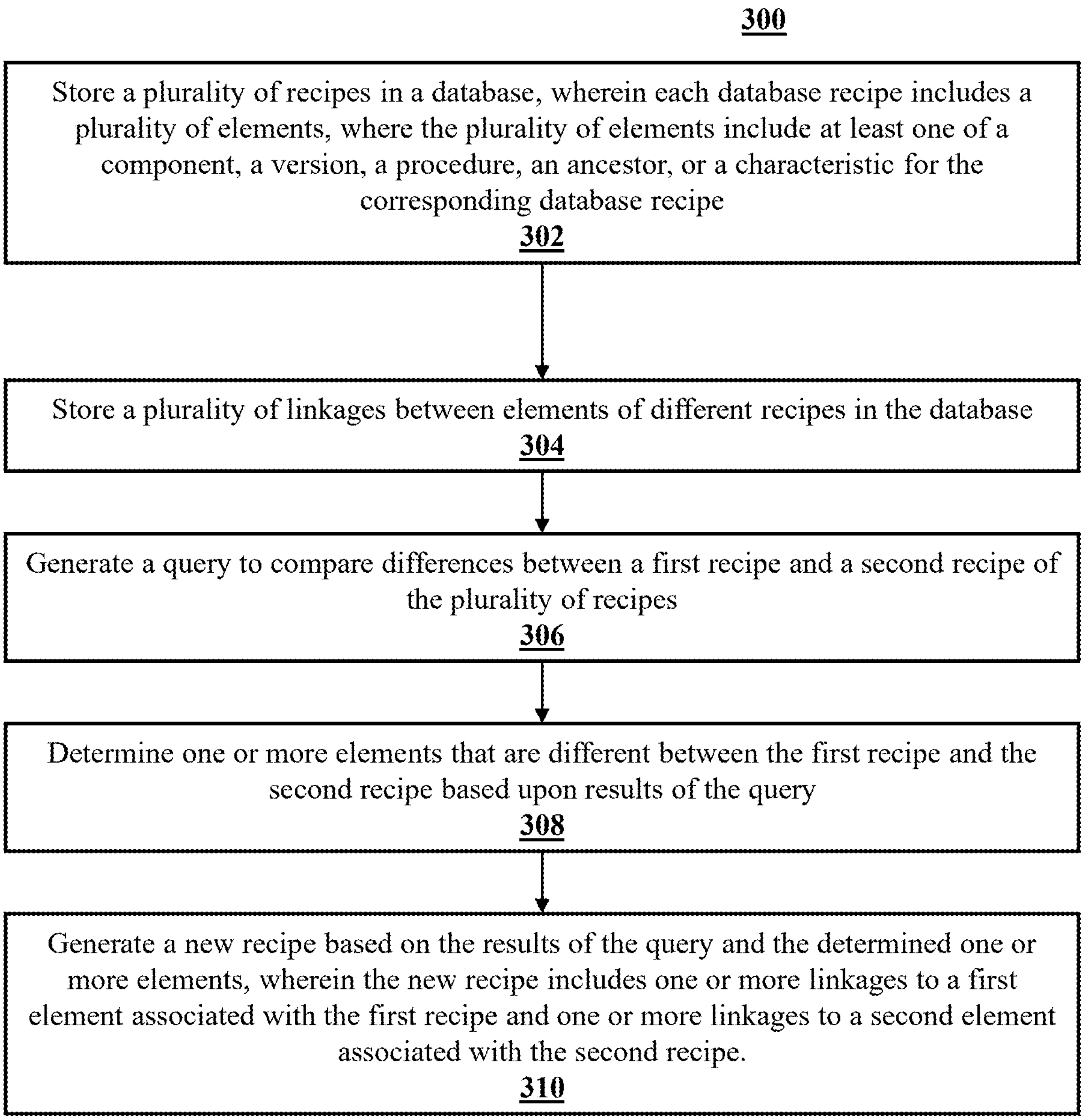
FIG. 3 illustrates a flow chart of another exemplary computer-implemented process of managing a dynamic database.

FIG. 3 illustrates a flowchart of an exemplary computer-implemented process 300 of managing a dynamic database (shown in FIGS. 1 and 2). In some embodiments, process 300 is performed by a computing system 400 (shown in FIG. 4). In other embodiments, one or more steps of process 300 are performed by the dynamic human machine interface (DHMI) computing device 420 (shown in FIG. 4).

In the exemplary embodiment, the method includes storing 302 a plurality of recipes in a database, wherein each database recipe includes a plurality of elements, where the plurality of elements include at least one of a component, a version, a procedure, an ancestor, or a characteristic for the corresponding database recipe.

In the exemplary embodiment, the method further includes storing 304 a plurality of linkages between elements of different recipes in the database.

In the exemplary embodiment, the method further includes generating 306 a query to compare differences between a first recipe and a second recipe of the plurality of recipes.

In the exemplary embodiment, the method further includes determining 308 one or more elements that are different between the first recipe and the second recipe based upon results of the query.

In the exemplary embodiment, the method further includes generating 310 a new recipe based on the results of the query and the determined one or more elements, wherein the new recipe includes one or more linkages to a first element associated with the first recipe and one or more linkages to a second element associated with the second recipe.

Exemplary Computer System

Figure 4:
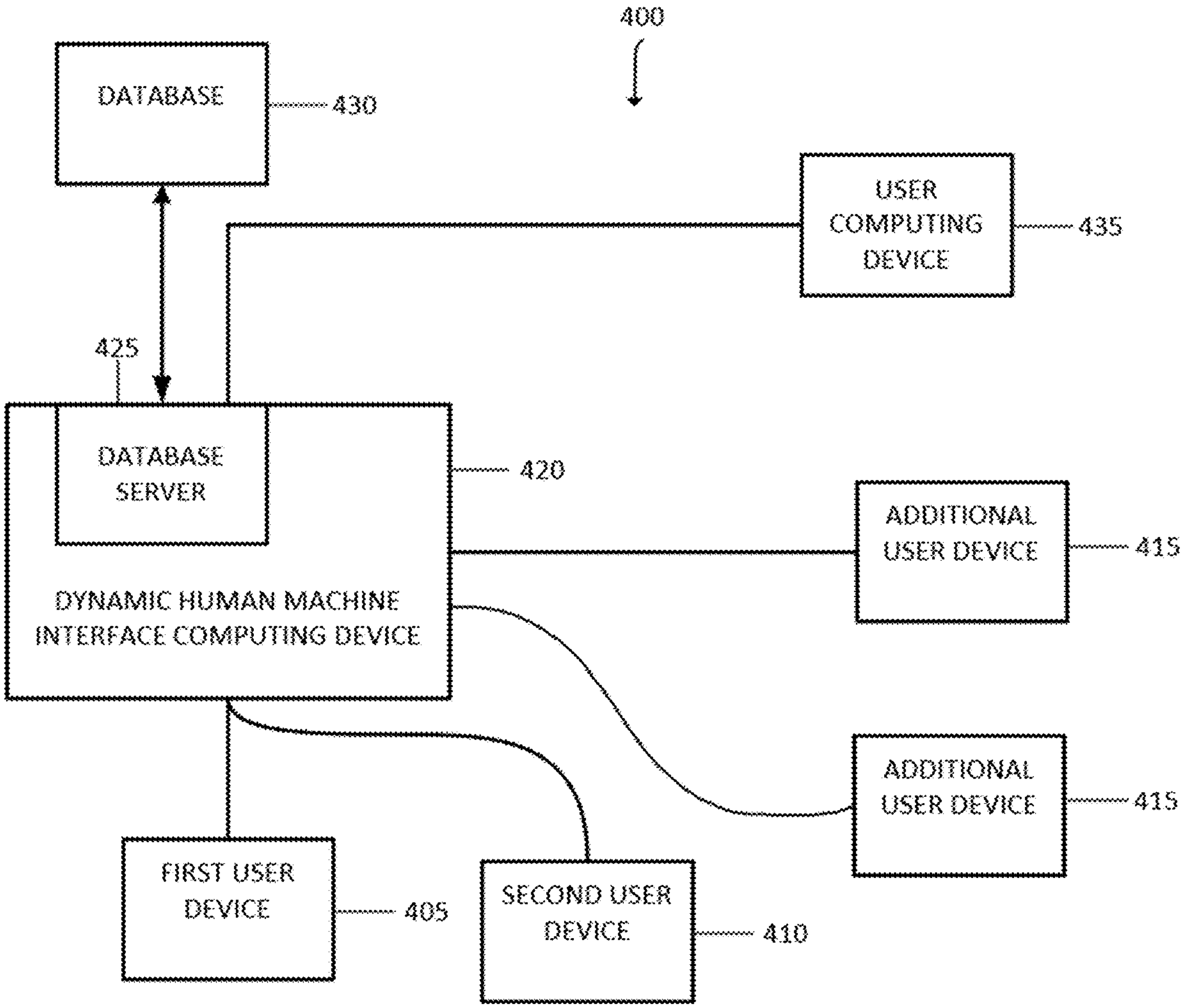
FIG. 4 illustrates an exemplary configuration of a database server device, in accordance with one embodiment of the present disclosure.

FIG. 4 illustrates a simplified block diagram of an exemplary computer system 400 for implementing the processes 100 and 300 (shown in FIGS. 1 & 3). In the exemplary embodiment, computer system 400 may be used for providing a user interface for the dynamic database (shown in FIG. 1). As described below in more detail, a dynamic human machine interface (DHMI) server 420 (also known as a dynamic human machine interface (DHMI) computer device 420) may be configured to store a plurality of recipes in a database, wherein each database recipe includes at least one element, the least one element including at least one of a component, a version, a procedure, an ancestor, or a characteristic; store a plurality of linkages between elements of recipes in the database; generate a query to compare differences between a first recipe and a second recipe of the plurality of recipes; and generate a new recipe based on a result of the query to compare, wherein the new recipe includes one or more linkages to an element associated with the first recipe or the second recipe.

In the exemplary embodiment, first user device 405, second user device 410, and additional user devices 415 are computers that control one or more aspects of the management of a dynamic database (shown in FIG. 1 and FIG. 2). Furthermore, first user device 405, second user device 410, and additional user devices 415 are in communication with the dynamic human machine interface (DHMI) computing device 420, using the Internet or other network. More specifically, first user device 405, second user device 410, and additional user devices 415 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. In at least one embodiment, the first user device 405, the second user device 410, and the additional user devices 415 are all in communication with the DHMI computing device 420 to receive and store recipes and queries.

A database server 425 may be communicatively coupled to a database 430 that stores data. In one embodiment, database 430 may include recipes, group, and user information. In the exemplary embodiment, database 430 may be stored remotely from DHMI computing device 420. In some embodiments, database 430 may be decentralized. In the exemplary embodiment, the user may access database 430 via user computing device 435 by logging onto DHMI computing device 420, as described herein.

In the exemplary embodiment, user computer devices 435 are computers that include a web browser or a software application, which enables user computer devices 435 to access remote computer devices, such as DHMI computing device 420, using the Internet or other network. More specifically, user computer devices 435 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 435 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

DHMI computing device 420 (also known as DHMI server 420) may be communicatively coupled with one or more of first user device 405, second user device 410, and additional user devices 415. In some embodiments, DHMI computing device 420 may be associated with, or is part of a computer network associated with a third party, or in communication with third-party network or information provider network. In other embodiments, DHMI computing device 420 may be associated with a third party and is merely in communication with the information networks. More specifically, DHMI computing device 420 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. DHMI computing device 420 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, DHMI computing device 420 hosts an application or website that allows the first user device 405, second user device 410, and additional user devices 415 to access the functionality described herein. In some further embodiments, first user device 405, second user device 410, and additional user devices 415 include an application that facilitates communication with DHMI computing device 420.

Exemplary Client Device

Figure 5:
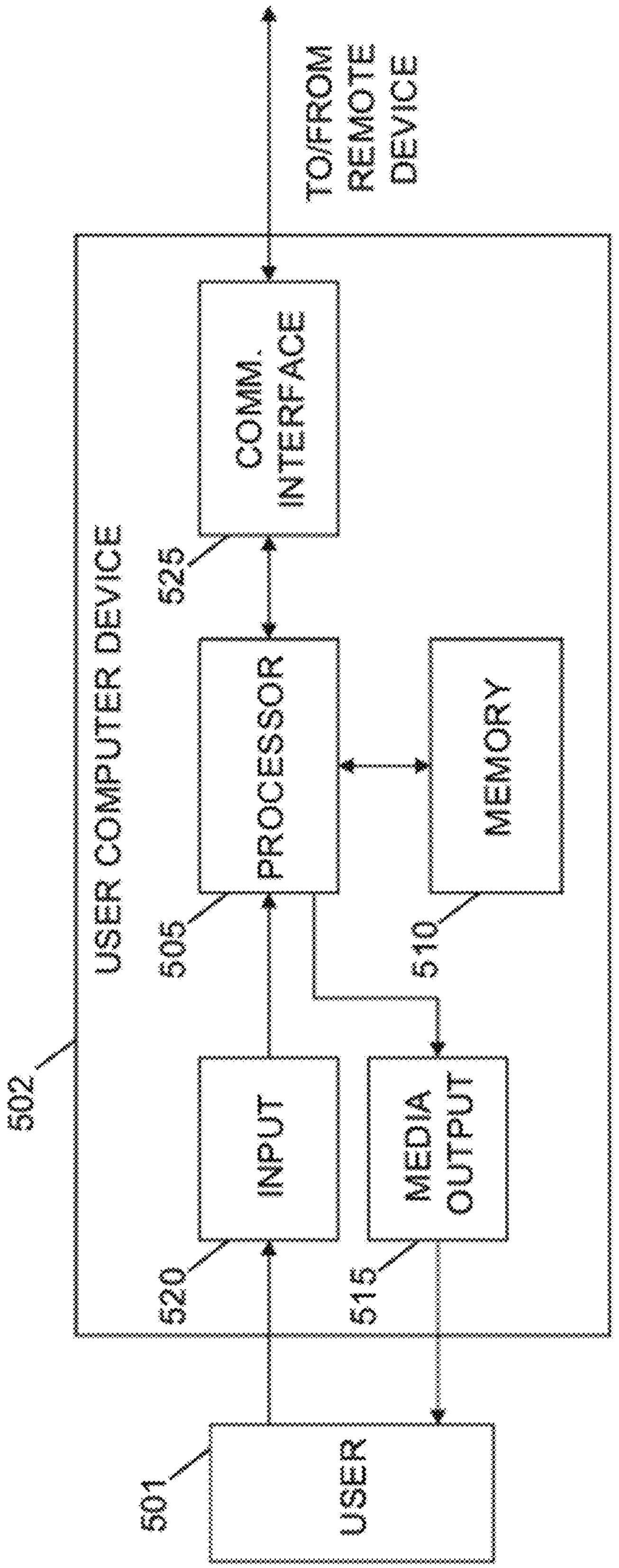
FIG. 5 illustrates an exemplary configuration of a user computer device, in accordance with one embodiment of the present disclosure.

FIG. 5 depicts an exemplary configuration of the computer devices that may be used to implement various parts of the processes of FIGS. 1 and 3, in accordance with one embodiment of the present disclosure. User computer device 502 may be operated by a user 501. In the exemplary embodiment, user 501 may be a user of the dynamic database system (e.g., a contributing or searching user or member of a group as shown in FIG. 1). User computer device 502 may include a processor 505 for executing instructions. In some embodiments, executable instructions are stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, a homepage display as described with respect to FIG. 1. In some embodiments, user computer device 502 may include an input device 520 for receiving input from user 501. User 501 may use input device 520 to, without limitation, select and/or enter one or more items to update.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as a mobile device. Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website. A client application allows user 501 to interact with, for example. For example, instructions may be stored by a cloud service, and the output of the execution of the instructions sent to the media output component 515.

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 may be programmed with the instruction such as illustrated in FIGS. 1 & 3.

In some embodiments, user computer device 502 may include, or be in communication with, one or more sensors. User computer device 502 may be configured to receive data from the one or more sensors and store the received data in memory area 510. Furthermore, user computer device 502 may be configured to transmit the sensor data to a remote computer device, through communication interface 525.

Exemplary Server Device

Figure 6:
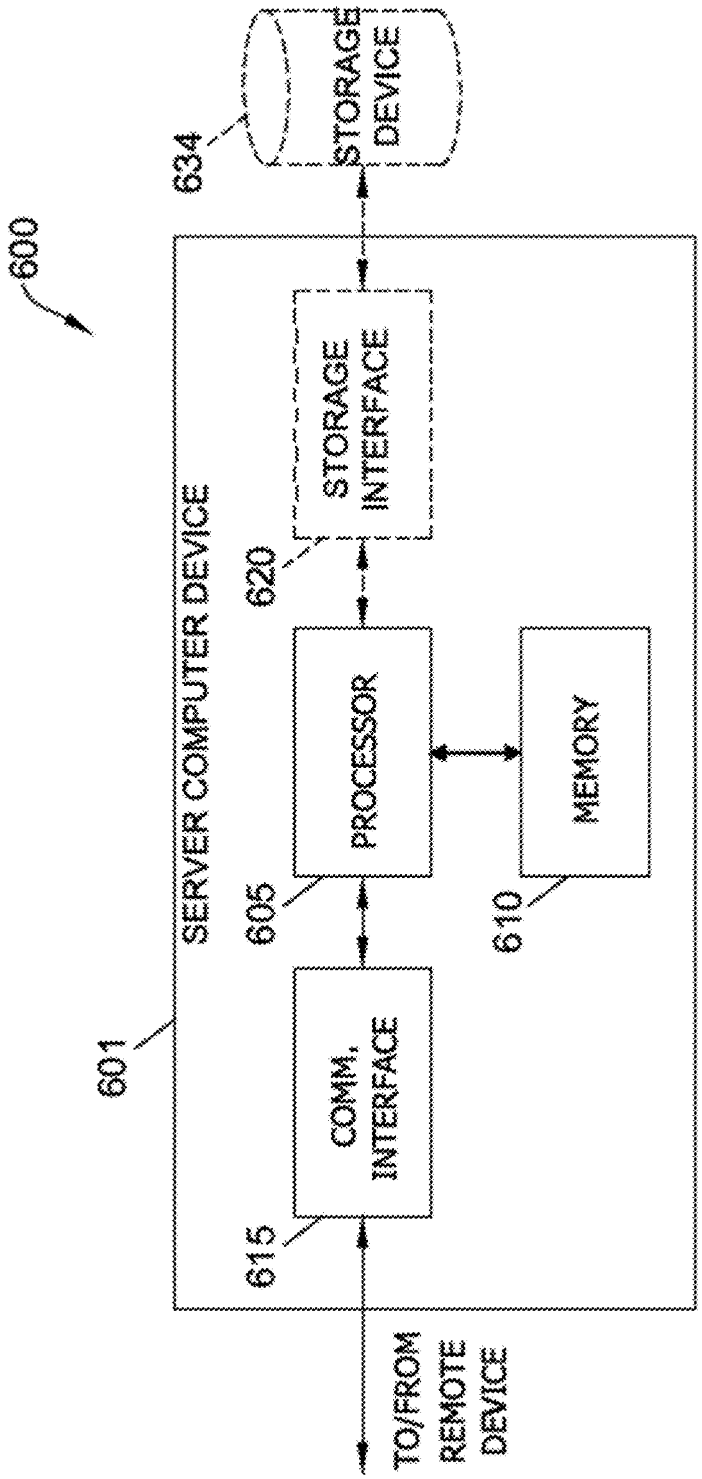
FIG. 6 illustrates an exemplary configuration of a server computer device, in accordance with one embodiment of the present disclosure.

FIG. 6 depicts an exemplary configuration 600 of a server computer device 601, in accordance with one embodiment of the present disclosure. In the exemplary embodiment, server computer device 601 may be similar to, or the same as, the dynamic database system described with respect to FIGS. 1, 2, and 3. Server computer device 601 may include, but is not limited to, a database server. Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601 or a user computing device (for example, using wireless communication or data transmission over one or more radio links or digital communication channels). For example, communication interface 615 may receive requests from user computer devices via the Internet, as illustrated in FIG. 5.

Processor 605 may also be operatively coupled to a storage device 634. Storage device 634 may be any computer-operated hardware suitable for storing and/or retrieving data, such as, but not limited to, data associated with the dynamic database system (shown in FIGS. 1 and 3). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid-state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIGS. 1 & 3.

In the exemplary embodiment, a processor of a dynamic database system is programmed to store a plurality of recipes in a database, wherein each database recipe includes a plurality of elements, where the plurality of elements include at least one of a component, a version, a procedure, an ancestor, or a characteristic for the corresponding database recipe.

In some further embodiments, the processor is further programmed to store a plurality of linkages between elements of different recipes in the database.

In some further embodiments, the processor is further programmed to generate a query to compare differences between a first recipe and a second recipe of the plurality of recipes and determine one or more elements that are different between the first recipe and the second recipe based upon results of the query.

In some further embodiments, the processor is further programmed to generate a new recipe based on the results of the query and the determined one or more elements, wherein the new recipe includes one or more linkages to a first element associated with the first recipe and one or more linkages to a second element associated with the second recipe.

In some further embodiments, the processor is further programmed to generate the new recipe by prompting a user to select one or more element associated with the first recipe or the second recipe and generating the new recipe based upon the selection.

In some further embodiments, the processor is further programmed to store one or more linkages between a plurality of versions of a recipe of the plurality of recipes.

In some further embodiments, the processor is further programmed to automatically adjust a measuring metric associated with an element of the first recipe and the second recipe to enable comparison of the first recipe and the second recipe. The processor may further be programmed to adjust the measuring metric by computing a highest common denominator for a unit of measure and converting at least one of the element of the first recipe or the element of the second recipe to the highest common denominator unit of measure.

In some further embodiments, the processor is further programmed to store an element of a recipe as a linkage to an ancestor of the recipe, wherein the ancestor of the recipe includes at least one element in common with the recipe.

In some further embodiments, the processor is further programmed to prompt a user to enter a search term, query the database based upon the search term, transmit the database recipe to a user computing device, where the transmitted recipe includes one or more linkages to an element of another database recipe.

In some further embodiments, the processor is further programmed to prompt a user to enter identifying information for an external data source, identify a potential database recipe associated with the external data source, and generate a new database recipe based upon the identification, where the new database recipe includes a link to the external data source.

Exemplary Implementation

The dynamic database system described herein may be implemented using a variety of technology. An example implementation of the dynamic database system may include at least, for example, a backend web service API, a frontend user interface website, a database storage account (e.g., for storing JSON files), a function process (e.g., for parsing JSON files), and a database server configured to allow for queries to retrieve data (e.g., an SQL database). Though an example implementation is described above, the dynamic database system may be implemented in various ways, including at least with alterations to database technology, changing the storage medium for recipes and information files, and/or by presenting the user interface in various ways, including mobile apps, display interfaces, and/or AR/VR outputs.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., recipes, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

The exemplary systems and methods described and illustrated herein therefore significantly increase the traceability of database items and reduce the storage and computational overhead associated with database operations.

Exemplary embodiments of systems and methods for dynamic database management are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A dynamic database system comprising at least one processor in communication with at least one memory device, the at least one processor programmed to:

- store a plurality of recipes in a database, wherein each database recipe includes a plurality of elements, where the plurality of elements include at least one of a component, a version, a procedure, an ancestor, or a characteristic for the corresponding database recipe;
- store a plurality of linkages between elements of different recipes in the database;
- generate a query to compare differences between a first recipe and a second recipe of the plurality of recipes;
- determine one or more elements that are different between the first recipe and the second recipe based upon results of the query; and
- generate a new recipe based on the results of the query and the determined one or more elements, wherein the new recipe includes one or more linkages to a first element associated with the first recipe and one or more linkages to a second element associated with the second recipe.

2. The database system of claim 1, wherein generating the new recipe further comprises prompting a user to select one or more element associated with the first recipe or the second recipe and generating the new recipe based upon the selection.

3. The database system of claim 1, wherein the processor is further programmed to store one or more linkages between a plurality of versions of a recipe of the plurality of recipes.

4. The database system of claim 1, wherein the processor is further programmed to automatically adjust a measuring metric associated with an element of the first recipe and the second recipe to enable comparison of the first recipe and the second recipe.

5. The database system of claim 4, wherein adjusting the measuring metric further comprises computing a highest common denominator for a unit of measure and converting at least one of the element of the first recipe or the element of the second recipe to the highest common denominator unit of measure.

6. The database system of claim 1, wherein the processor is further programmed to store an element of a recipe as a linkage to an ancestor of the recipe, wherein the ancestor of the recipe includes at least one element in common with the recipe.

7. The database system of claim 1, wherein the processor is further programmed to:

- prompt a user to enter a search term;
- query the database based upon the search term; and
- transmit the database recipe to a user computing device, where the transmitted recipe includes one or more linkages to an element of another database recipe.

8. The database system of claim 1, wherein the processor is further programmed to:

- prompt a user to enter identifying information for an external data source;
- identify a potential database recipe associated with the external data source; and
- generate a new database recipe based upon the identification, where the new database recipe includes a link to the external data source.

9. A computer-implemented method for dynamic database management, the method implemented by at least one processor in communication with at least one memory, the method comprising:

- storing a plurality of recipes in a database, wherein each database recipe includes a plurality of elements, where the plurality of elements include at least one of a component, a version, a procedure, an ancestor, or a characteristic for the corresponding database recipe;
- storing a plurality of linkages between elements of different recipes in the database;
- generating a query to compare differences between a first recipe and a second recipe of the plurality of recipes;
- determining one or more elements that are different between the first recipe and the second recipe based upon results of the query; and
- generating a new recipe based on the results of the query and the determined one or more elements, wherein the new recipe includes one or more linkages to a first element associated with the first recipe and one or more linkages to a second element associated with the second recipe.

10. The computer-implemented method of claim 9, wherein generating the new recipe further comprises prompting a user to select one or more element associated with the first recipe or the second recipe and generating the new recipe based upon the selection.

11. The computer-implemented method of claim 9, further comprising storing one or more linkages between a plurality of versions of a recipe of the plurality of recipes.

12. The computer-implemented method of claim 9, further comprising automatically adjusting a measuring metric associated with an element of the first recipe and the second recipe to enable comparison of the first recipe and the second recipe.

13. The computer-implemented method of claim 12, wherein adjusting the measuring metric further comprises computing a highest common denominator for a unit of measure and converting at least one of the element of the first recipe or the element of the second recipe to the highest common denominator unit of measure.

14. The computer-implemented method of claim 9, further comprising storing an element of a recipe as a linkage to an ancestor of the recipe, wherein the ancestor of the recipe includes at least one element in common with the recipe.

15. The computer-implemented method of claim 9, further comprising:

prompting a user to enter a search term;

querying the database based upon the search term; and transmitting the database recipe to a user computing device, where the transmitted recipe includes one or more linkages to an element of another database recipe.

16. The computer-implemented method of claim 9, further comprising:

prompting a user to enter identifying information for an external data source;

identifying a potential database recipe associated with the external data source; and generating a new database recipe based upon the identification, where the new database recipe includes a link to the external data source.

17. A computer-implemented method for dynamic database management, the method implemented by at least one processor in communication with at least one memory, the method comprising:

storing a plurality of recipes in a database, wherein each database recipe includes a plurality of elements, wherein the plurality of elements including at least one of a component, a version, a procedure, an ancestor, or a characteristic for the corresponding database recipe;

storing a plurality of linkages between elements of different recipes in the database;

prompting a user to enter a search term;

querying the database to return a first database recipe based upon the search term; and transmitting the first database recipe to a user computing device, where the transmitted database recipe includes one or more linkages to an element of a second database recipe.

18. The computer-implemented method of claim 17, the method further comprising:

generating a query to compare differences between the first recipe and a second recipe of the plurality of recipes;

determining one or more elements that are different between the first recipe and the second recipe based upon results of the query; and generating a new recipe based on the results of the query and the determined one or more elements, wherein the new recipe includes one or more linkages to a first element associated with the first recipe and one or more linkages to a second element associated with the second recipe.

19. The computer-implemented method of claim 17, the method further comprising:

prompting a user to enter identifying information for an external data source;

identifying a potential database recipe associated with the external data source; and generating a new database recipe based upon the identification, where the new database recipe includes a link to the external data source.

20. The computer-implemented method of claim 17, the method further comprising automatically adjusting a metric associated with a component of the first recipe and the second recipe to enable comparison of the first recipe and the second recipe.

* * * * *